(12) United States Patent
Chua

(10) Patent No.: US 11,854,354 B2
(45) Date of Patent: Dec. 26, 2023

(54) MOBILE CONTROL UNIT, FACILITY MANAGEMENT SYSTEM, MOBILE UNIT CONTROL SYSTEM, FACILITY MANAGEMENT METHOD AND MOBILE UNIT CONTROL METHOD

(71) Applicant: CONCORDE ASIA PTE. LTD., Singapore (SG)

(72) Inventor: Swee Kheng Chua, Singapore (SG)

(73) Assignee: CONCORDE ASIA PTE. LTD., Singapore (SG)

( * ) Notice: Subject to any disclaimer, the term of this patent is extended or adjusted under 35 U.S.C. 154(b) by 0 days.

(21) Appl. No.: 15/029,137

(22) PCT Filed: Oct. 14, 2013

(86) PCT No.: PCT/SG2013/000439
§ 371 (c)(1),
(2) Date: Apr. 13, 2016

(87) PCT Pub. No.: WO2015/057157
PCT Pub. Date: Apr. 23, 2015

(65) Prior Publication Data
US 2016/0240076 A1    Aug. 18, 2016

(51) Int. Cl.
*G08B 25/14* (2006.01)
*G08B 25/00* (2006.01)
*H04W 4/02* (2018.01)

(52) U.S. Cl.
CPC ........... *G08B 25/14* (2013.01); *G08B 25/009* (2013.01); *H04W 4/025* (2013.01)

(58) Field of Classification Search
CPC ........... G08B 25/009; G08B 25/00–14; H04W 4/025
See application file for complete search history.

(56) References Cited

U.S. PATENT DOCUMENTS 5,103,474 A    4/1992   Stoodley et al.
9,786,106 B2   10/2017  Chua
(Continued)

FOREIGN PATENT DOCUMENTS

CN    202189447 U    4/2012
CN    203111119 U    8/2013
(Continued)

OTHER PUBLICATIONS

European Search Report for EP 13895855.0, European Patent Office, dated Jun. 1, 2017, 9 pgs.
(Continued)

*Primary Examiner* — Aaron L Troost
(74) *Attorney, Agent, or Firm* — Martin & Ferraro, LLP

(57) ABSTRACT

A mobile control unit adapted to move to a plurality of premises, the mobile control unit having a central monitoring system in communication with a facility system of each of the plurality of premises, such that the mobile control unit is adapted to move to one of the plurality of premises when alerted by the facility system of the one of the plurality of premises. A facility management system adapted to manage at least one of the plurality of premises, the facility management system having the mobile control unit and a facility system adapted to monitor each of the plurality of premises. A method of monitoring the plurality of premises using the mobile control unit. A facility management system having a plurality of mobile control units and a main control unit adapted to monitor the location of the plurality of mobile control units. A facility monitoring method having monitoring the location of a plurality of mobile control units from a main control unit; and communicating between the main control unit and the plurality of mobile control units.

19 Claims, 8 Drawing Sheets

(56) References Cited

U.S. PATENT DOCUMENTS

| | | | |
|---|---|---|---|
| 9,953,513 B2 | 4/2018 | Chua | |
| 2002/0174367 A1* | 11/2002 | Kimmel | G08B 13/19684 |
| | | | 726/4 |
| 2003/0184436 A1 | 10/2003 | Seales | |
| 2004/0085205 A1 | 5/2004 | Yeh | |
| 2005/0174229 A1* | 8/2005 | Feldkamp | G08B 13/19695 |
| | | | 340/506 |
| 2006/0242679 A1* | 10/2006 | Hutchison, III | H04N 7/17318 |
| | | | 725/105 |
| 2007/0139183 A1* | 6/2007 | Kates | G08B 25/005 |
| | | | 340/539.22 |
| 2009/0023421 A1* | 1/2009 | Parkulo | G08B 21/0415 |
| | | | 455/556.1 |
| 2009/0041206 A1* | 2/2009 | Hobby | H04W 4/90 |
| | | | 379/45 |
| 2009/0042533 A1* | 2/2009 | Lontka | G08B 21/02 |
| | | | 455/404.1 |
| 2009/0322874 A1* | 12/2009 | Knutson | G08B 13/196 |
| | | | 348/143 |
| 2010/0013921 A1* | 1/2010 | Joko | G08B 13/19647 |
| | | | 348/143 |
| 2011/0071880 A1* | 3/2011 | Spector | H04W 4/22 |
| | | | 340/573.1 |
| 2012/0078497 A1* | 3/2012 | Burke, Jr. | G08G 1/0104 |
| | | | 701/300 |
| 2013/0006468 A1* | 1/2013 | Koehrsen | G08G 1/20 |
| | | | 701/36 |
| 2013/0009771 A1 | 1/2013 | Simon | |
| 2014/0227967 A1* | 8/2014 | Savage | H04B 7/18517 |
| | | | 455/12.1 |
| 2015/0015381 A1* | 1/2015 | McNutt | G08B 25/12 |
| | | | 340/287 |
| 2015/0113113 A1 | 4/2015 | Yang | |
| 2015/0334087 A1 | 11/2015 | Dawes | |
| 2020/0320856 A1 | 10/2020 | Zhang | |

FOREIGN PATENT DOCUMENTS

| | | |
|---|---|---|
| JP | 2003-242231 | 8/2003 |
| JP | 2003242231 A * | 8/2003 |
| JP | 2004185581 A * | 7/2004 |
| JP | 2013-047946 A | 3/2013 |
| TW | 200305115 A | 10/2003 |
| TW | 200820754 A | 5/2008 |

OTHER PUBLICATIONS

First Office Action for Chinese Patent Application No. 201380081032.2 (with translation), Chinese Patent Office, dated Jun. 20, 2017, 14 pgs.

Official Notice of Office Action for TW103135220, dated Jun. 15, 2017, 4 pgs.

* cited by examiner

MOBILE CONTROL UNIT, FACILITY MANAGEMENT SYSTEM, MOBILE UNIT CONTROL SYSTEM, FACILITY MANAGEMENT METHOD AND MOBILE UNIT CONTROL METHOD

This is a National Phase Application under 35 USC 371 of PCT/SG2013/000439 filed Oct. 14, 2013 (published on Apr. 23, 2015 as WO 2015/057157), which is incorporated herein by reference.

FIELD OF INVENTION

The present invention relates to a mobile control unit, a facility management system and facility management method adapted to manage a plurality of premises, e.g. buildings, offices, a mobile unit control system and a mobile unit control method adapted to monitor and control a plurality of mobile control units.

BACKGROUND

Premises, e.g. office buildings and factories, nowadays are monitored for security purposes and to detect disruption in building services and facilities.

Formerly, the premises were mostly monitored by personnel, e.g. security officers and maintenance crew, by patrolling and surveying the premises.

With the improvement in technology, nowadays, premises are equipped with monitoring systems to monitor facilities of the premises, e.g. security, building services. The monitoring systems may include security monitoring systems and facility monitoring systems, e.g. fire monitoring system, lift monitoring system.

In small premises, e.g. offices, within a large premise, e.g. building, it is more common for premise owners to install only security monitoring systems than facility monitoring systems as the latter may be monitored by the building owners. In the larger premises, e.g. buildings and factories, security officers may be engaged to patrol the premises and maintenance crew may be put on standby to monitor and respond to any disruption of building services. Typically, a control centre may be set up within the premise for the monitoring of the services.

A security monitoring system and facility monitoring system usually include a control panel, a detection system linked to the control panel and a transmission unit so as to transmit signals to a control centre to report the status of the facility. For example, a fire monitoring system may include a fire control panel and fire detection system, e.g. sensors, so that in the event of a fire, the sensors can pick up the smoke or heat and transmit a signal to the fire control panel which may then transmit an alarm signal to the control centre, e.g. a fire command centre. Usually, a security monitoring system may include a security control panel, close circuit cameras, card access system, sensors, intercom system, barrier system and motion detection system, all of which may be linked to the security control panel. Similarly, when an event occurs, e.g. breach in security, a security signal may be sent to the security control panel which may then send a security alarm signal to a control command centre, e.g. fire command centre, security command centre.

Typically, the engagement of personnel to monitor a premise is still preferred. In most premises, premise owners install only basic facility monitoring systems, e.g. close circuit camera, in addition to the personnel as they are already spending substantial amount of money in engaging the personnel and do not wish to incur any further expenditure in monitoring systems. In premises where immediate attention is required, e.g. security breach, disruption of building services, the premise owners usually prefer having security officers and/or maintenance crew within the premises so that they are able to attend to the situation promptly. Therefore, the premise owners are usually satisfied with this mixed arrangement of personnel and monitoring systems. In some instances, premise owners prefer not to install facility monitoring systems as the owners usually do not want to incur extra cost in installing the monitoring system and choose to accept that the presence of personnel is sufficient.

The cost for engaging personnel may be relatively high. FIG. 1 shows an exemplary map of an area with twelve premises 900 along a road 990. Security officers may be hired to work on 12 hour shifts at each premise to provide security monitoring services round the clock. Typically, at least one security officer may be deployed during the day and at least one security officer may be deployed during the night. Therefore, a total number of about 24 security officers may be required in the premises. Usually, there are more than one security officer deployed on each shift, therefore the cost, e.g. salary, of the security officers would be relatively much higher. In addition, each premise may have at least one maintenance crew to be physically onsite to attend to any disruption of building services. In certain cases, a maintenance team for a few essential building services may be required. Clearly, the cost of hiring the security officers and maintenance crew would be high. As mentioned earlier, a control centre is usually set up for each premise to hold the personnel. Therefore, in an area with a number of premises like in FIG. 1, the same number of control centres has to be set up to monitor each premise. Again, the cost of setting up the control centres would be high.

In an attempt to cut down the cost in monitoring the premises, premises owner may contract third party companies to monitor the security and building services in the premises. This is possible with the use of technology. However, the response time by the third party companies to attend to an incident at the premises may be slow. The companies may be located far away from the premises and monitoring is done remotely via communication between the companies and monitoring systems, e.g. control panel, card access system, sensors, close circuit cameras, intercom system, barrier system, motion detection system, installed on the premises. If an incident occurs, e.g. security breach or disruption of a building service, the companies would send relevant personnel, e.g. security officer and/or maintenance crew to the premises, to verify or attend to the incident. The personnel would require time to travel to the premise and would not be able to attend to the incident within a short period of time, e.g. minutes. For security related incidents, e.g. break in, the thief would have time to make an escape with the loot. In other non security related incidents, e.g. lift break down, a terrified passenger trapped in a lift would have to wait for a substantially long period of time at least time for the maintenance crew to travel from the company to the premise.

Therefore, a solution to address the above disadvantages would be very useful.

SUMMARY

According to various embodiments, a mobile control unit adapted to move to a plurality of premises may be provided. The mobile control unit may include a central monitoring system adapted to communicate with a facility system of each of the plurality of premises, wherein the mobile control unit is adapted to move to one of the plurality of premises when alerted by the facility system of the one of the plurality of premises.

Accordingly to various embodiments, the mobile control unit may include a vehicular control unit.

Accordingly to various embodiments, the vehicular control unit may include a van.

Accordingly to various embodiments, the mobile control unit may include a Global Positioning System device adapted to determine the location of the mobile control unit.

Accordingly to various embodiments, the central monitoring system may include a security monitoring system adapted to monitor at least one of a security system of the facility system or a building services monitoring system adapted to monitor the building services systems of the facility system.

Accordingly to various embodiments, communication between the central monitoring system and facility system may be via at least one of a wide area network or wireless local area network.

Accordingly to various embodiments, the mobile control unit may be adapted to patrol at least one of the plurality of premises.

Accordingly to various embodiments, a facility management system adapted to manage at least one of the plurality of premises may be provided. The facility management system may include a mobile control unit according to one of the above embodiments; and a plurality of facility systems, each facility system adapted to monitor one of the plurality of premises.

Accordingly to various embodiments, the facility system may include a security system, wherein the security system may be adapted to send a security signal to the central monitoring system when required.

Accordingly to various embodiments, the facility system may include building services systems, wherein the building services systems may be adapted to send an alert signal to the central monitoring system when required.

Accordingly to various embodiments, a facility management method of monitoring a plurality of premises using a mobile control unit may be provided. Each of the plurality of premises may be equipped with a facility system. The method may include monitoring at least one of the facility systems; communicating between the central monitoring system of the mobile control unit and at least one of the facility systems of the plurality of premises; and moving the mobile control unit to the premise of the one of the facility systems when alerted by the one of the facility systems of the one of the plurality of premises.

Accordingly to various embodiments, wherein monitoring the facility system may include monitoring a security system of the facility system.

Accordingly to various embodiments, wherein monitoring the facility system includes monitoring building services systems of the facility system.

Accordingly to various embodiments, wherein the method further includes patrolling around at least one of the plurality of premises.

Accordingly to various embodiments, a mobile unit control system may be provided. The mobile unit control system may include a plurality of mobile control units according to the various embodiment mentioned above, a main control unit may be adapted to monitor the location of the plurality of mobile control units, the main control unit may be adapted to be in communication with the plurality of mobile control units and controlling the plurality of mobile control units.

Accordingly to various embodiments, a mobile unit control method may be provided. The mobile unit control method may include monitoring the location of a plurality of mobile control units according to any one of the above embodiments from a main control unit; and communicating between the main control unit and the plurality of mobile control units.

The mobile control unit provides a reduction in the manpower needed by consolidating the resource to monitor the premises and yet a relative faster response time when required. By reducing manpower, cost is reduced, yet, the monitoring of the premises may be more effective and efficient.

DETAILED DESCRIPTION

Figure 1:
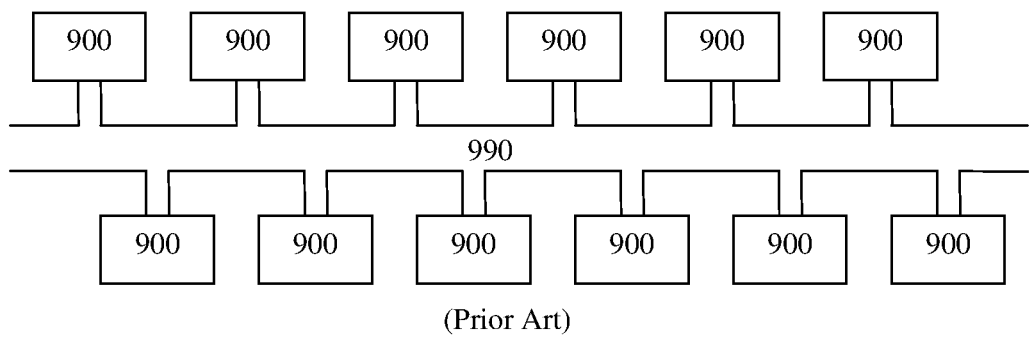
FIG. 1 shows a layout of premises along a road.
Figure 2:
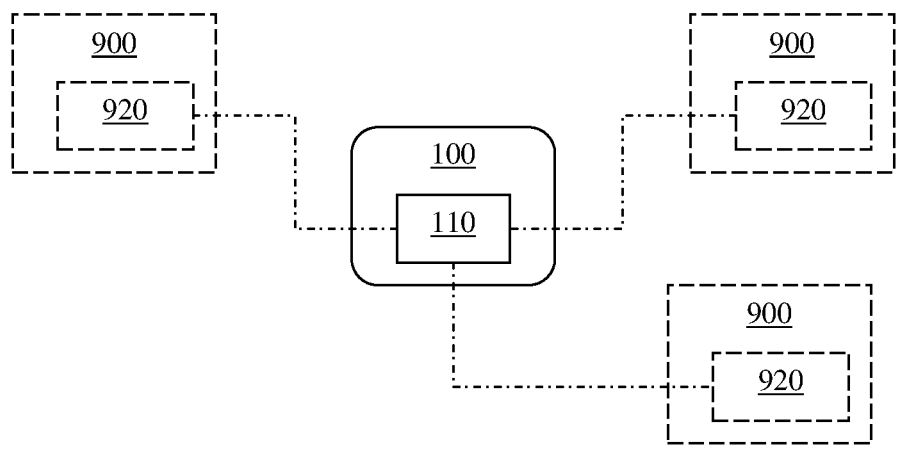
FIG. 2 shows a schematic view of an exemplary embodiment of a mobile control unit connected to a plurality of premises.

FIG. 2 shows an exemplary embodiment of a mobile control unit 100 adapted to move to a plurality of premises 900. The mobile control unit 100 has a central monitoring system 110 that is adapted to be adapted to communicate with a facility system 920 of each of the plurality of premises 900. The mobile control unit 100 is adapted to move to one of the plurality of premises 900 when alerted by the facility system 920 of the one of the plurality of premises 900.

The mobile control unit 100 may be a control unit that is able to move from a premise 900 to another and/or around each of the plurality of premises. Mobile control unit 100 may be a vehicular control unit, e.g. a trailer, a van, a car, a motorcycle, buggy. Vehicular control unit may be a vehicle that is modified to be equipped with the central monitoring system 110. Mobile control unit 100 may even be a person on foot with a portable central monitoring system 110, e.g. handheld smart phone or tablet.

Figure 3:
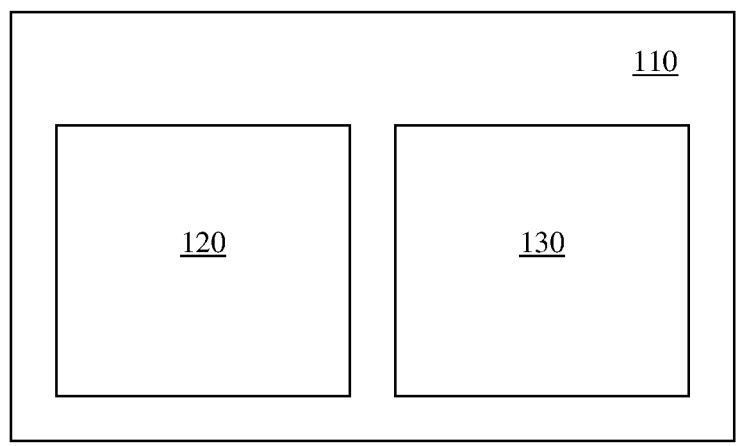
FIG. 3 shows a schematic view of a central monitoring system of the mobile control unit in FIG. 2.

FIG. 3 shows the schematic of a central monitoring system 110. Central monitoring system 110 may include a security monitoring system 120 adapted to monitor at least one of a security system 930 (not shown in FIG. 3) of the facility system 920 or a building services monitoring system 130 adapted to monitor the building services systems 950 (not shown in FIG. 3) of the facility system 920 of the premises 900.

Building services may include electrical services; escalators and lifts services; fire detection services; Heating, Ventilation and Air Conditioning (HVAC) services; water, drainage and plumbing services; communication lines, telephones and IT networks services etc.

Security monitoring system 120 and/or building service monitoring systems 130 may include at least one of the following: control panel, close circuit cameras, card access system, sensors, intercom system, barrier system, motion detection system, display monitors, servers, routers, signal encryption devices, tele-communication system, modems, DVRs, and building services monitoring systems.

Mobile control unit 100 may be manned by at least two personnel or at least three personnel. One of the at least two or at least three personnel may be a technician capable of attending to the building services signals received from the building, systems.

Figure 4:
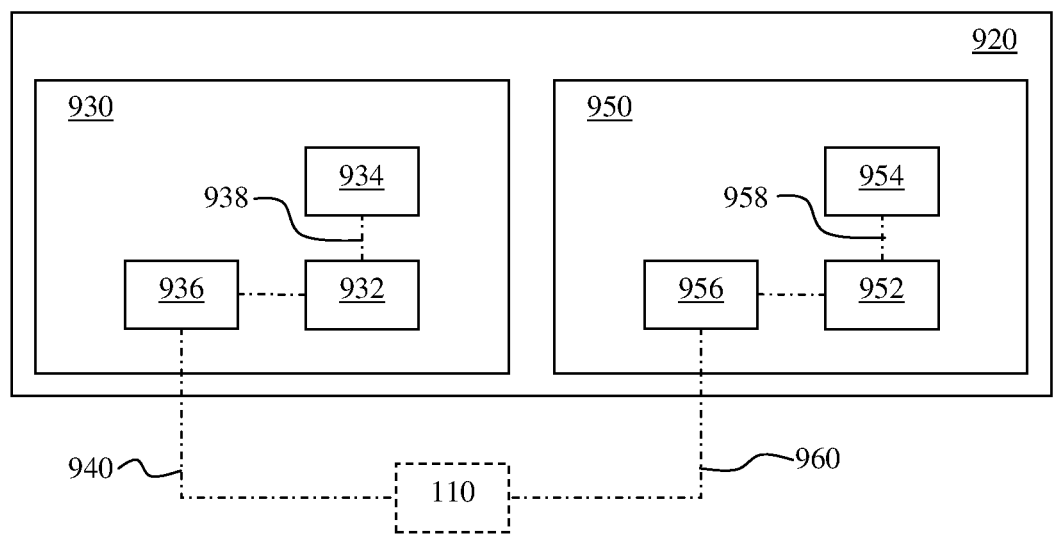
FIG. 4 shows schematic view of an exemplary embodiment of a facility system of the premise in FIG. 2.

As shown in FIG. 4, facility system 920 may include at least one security system 930. Security system 930 may include a security processing unit 932, a security detection system 934 and/or a security alarm system 936 connected to the security processing unit 932. The security processing unit 932 may be adapted to receive and process a security detection signal 938 sent by the security detection system 934. Security processing unit 932 may transmit a security alarm signal 940 to the central monitoring system 110 via the security alarm system 936.

Security detection system 934 may include security detection devices, e.g. video surveillance cameras, motion sensors. Detection devices may be installed at predetermined locations, e.g. strategic locations, to detect intrusion into the premises 900.

The facility system 920 may further include at least a building services system 950. The building services systems may include building services processing units 952, building services detection systems 954 and/or building services alarm systems 956 connected to the building services processing units 952. The building services processing unit 952 may be adapted to receive and process building services detection signal 958 sent by the building services detection systems 954. Building services processing unit 952 may transmit the building services alarm signals 960 to the central monitoring system 110 via the building alarm system 956.

Building services processing units 952 may include fire alarm panel, lift control panel, electrical panels etc.

Building services detection systems 954 may include building services detection devices, e.g. sensors, pressure gauges, for a building service, e.g. sprinkler system, to detect sudden fall in pressure of water which may be due to a burst pipe. The security detection devices 934 and building services detection devices 954 may be used for the purpose of detecting the respective services, e.g. close circuit camera for the security detection system 934 may be used for detecting building services.

Building services detection systems 954 may detect facilities, e.g. fire alarm systems, lifts, switch rooms, sprinkler and ejector pump rooms, water tank compartments, generator rooms, sump pumps, booster pumps, car park barrier systems, intercom systems, pressurization and exhaust fan control panel, hose reel tank, cooling towers, Air-con units/AHU, supply fans, etc.

Mobile control unit 100 may include a remote control system 112. Remote control system 112 may be adapted to control the facility system 920. Remote control system 112 may be adapted to control the security system 930 and/or the building services system 950.

Remote control system 112 may include a security remote control system 122 adapted to control the security system 930 and/or a building services remote control system 132 to control the building services system 950.

Figure 4A:
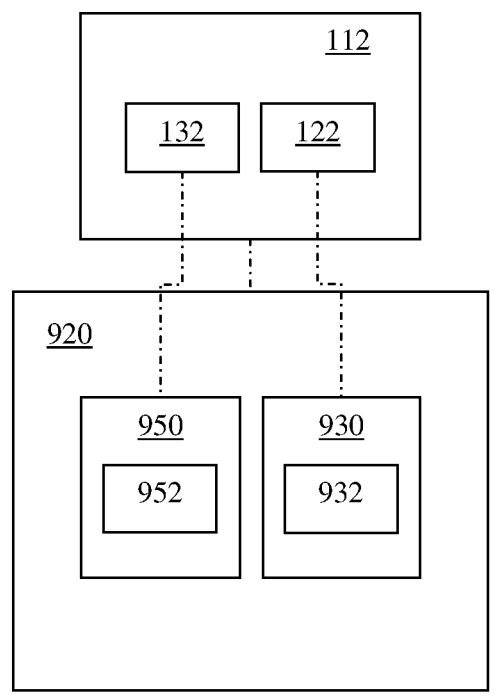
FIG. 4A shows a schematic view of an exemplary embodiment of a remote control system of the mobile control unit in FIG. 2.

As shown in FIG. 4A, security remote control system 122 may be in communication with the security processing unit 932 such that security remote control system 122 may be adapted to send a control signal to the security processing unit 932 to control relevant systems, e.g. card access system.

Building services remote control system 132 may be in communication with the building services processing unit 952 such that building services remote control system 132 may be adapted to send a control signal to the building services processing unit 952 to control relevant systems, e.g. fire alarm.

For example, in the event of a false fire alarm in a premise 900, building processing unit 952 may send a building alarm signal 960, e.g. fire alarm signal, to the building service monitoring system 130. Duty personnel may investigate the cause of the alarm, and upon identifying a false alarm, remote control system 132 may send a control signal to the building processing unit 952 to turn off the fire alarm at the premise 900. In another example, a visitor may request entry to a premise 900 and upon authentication, the mobile control unit 100 may unlock a door remotely to let the visitor enter without moving to the premise 900. In another example, the mobile control unit 100 may monitor and detect lights in a premise 900 being left turned on. Mobile control unit 100 may remotely switch off the lights in the premise 900. In this way, the mobile control unit 100 need not be moved to the premise 900 thereby saving time and resources. Similar examples may be applicable to the security remote control system 122 and the security processing unit 932.

Figure 5:
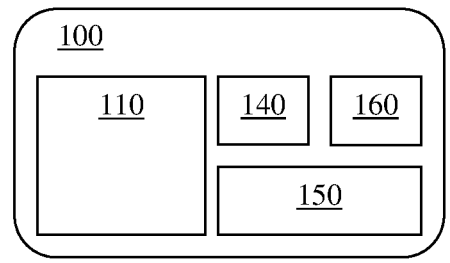
FIG. 5 shows a schematic view of an exemplary embodiment of the mobile control unit in FIG. 2.

Mobile control unit 100 may include a Global Positioning System (GPS) device 140 adapted to determine the location of the mobile control unit 100 as shown in FIG. 5. GPS 140 allows the tracking of the movement of the mobile control unit 100 and even a fleet of mobile control units 100. The tracking also provides information to the patrolling routes taken by the mobile control units 100 or personnel. Mobile control unit 100 may include a database adapted to back up the data gathered by the central monitoring system 110.

The central monitoring system 110 of the mobile control unit 100 may be powered by a power source 150, e.g. generator, battery pack. Battery pack may be rechargeable. For a vehicular control unit, the central monitoring system 110 may be powered by the power source, e.g. battery, of the vehicle. The mobile control unit 100 may include an Uninterrupted Power Supply (UPS) 160 connected to the central monitoring system 110 to provide uninterrupted power supply to the central monitoring system so that power supply would not be interrupted in the event of a power failure. The UPS would also provide some time to allow another mobile control unit 100 to be despatched so as to replace the faulty mobile control unit 100 or allow repair or replacement of the power supply. Mobile control unit 100 may return to a charging station (not shown) after a shift to recharge the battery pack.

The central monitoring system 110 and facility systems may communicate wirelessly. The central monitoring system 110 and facility systems may communicate via at least one of a wide area network (WAN) or wireless local area network (WLAN). Other forms of wireless communication may include radio network, cellular network.

Figure 6:
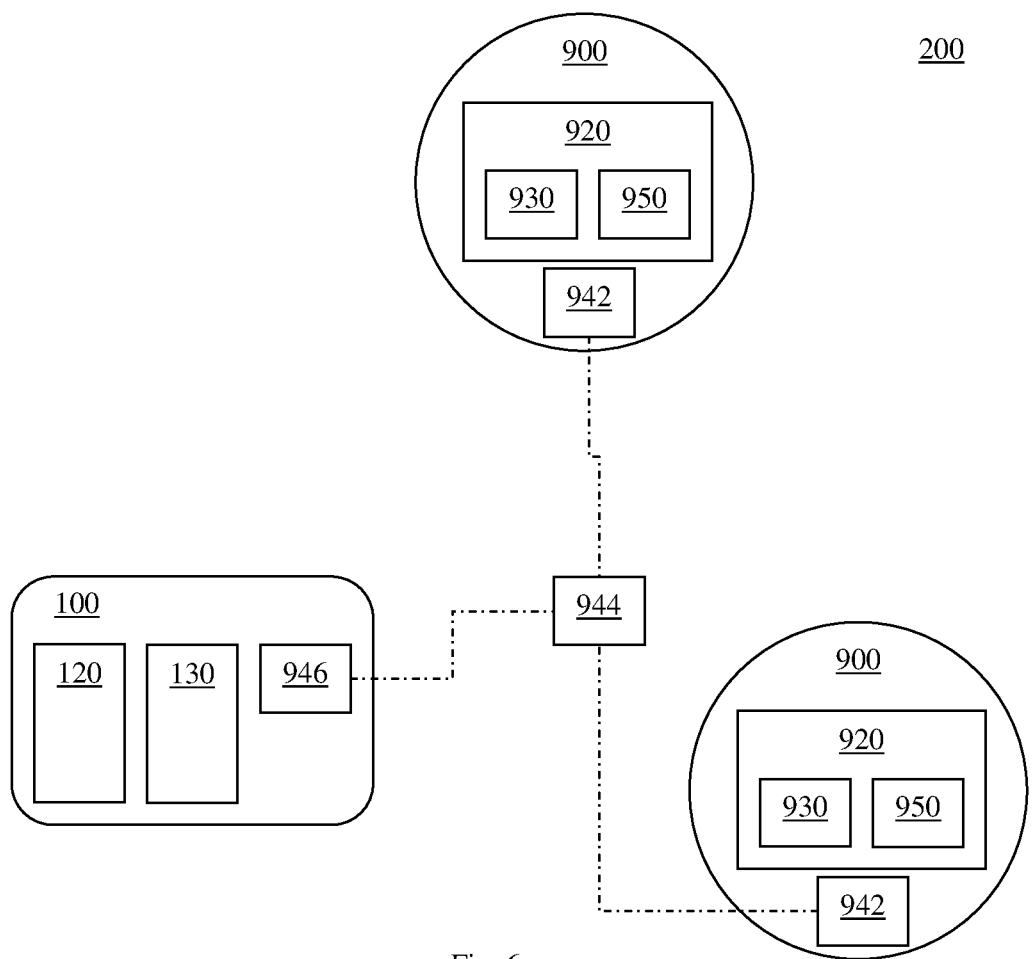
FIG. 6 shows a schematic view of an exemplary embodiment of a facility management system.

FIG. 6 shows a schematic diagram of the facility management system 200. Premise 900 may include a facility system 920. Facility system 920 may include security system 930 and building services systems 950. Premise 900 may include a premise network 942. Similarly, the same setup may be found in the other premises. The premise network 942 may be linked up to an Internet Service Provider (ISP) network 944 for communication purposes. The mobile control unit 100 may include a security monitoring system 120 and building services monitoring system 130. Mobile control unit 100 may include a mobile network 946 connected to the ISP network 944 so that communication between the premise 900 and the mobile control unit 100 may be established.

The mobile control unit 100 may be adapted to patrol around each of the plurality of premises 900. While the mobile control unit 100 is monitoring the premises 900, the mobile control unit 100 may patrol around at least one of the premises as it has the mobility to move between the premises, from one premise to another. The mobile control unit 100 may patrol around the plurality of premises.

Figure 7:
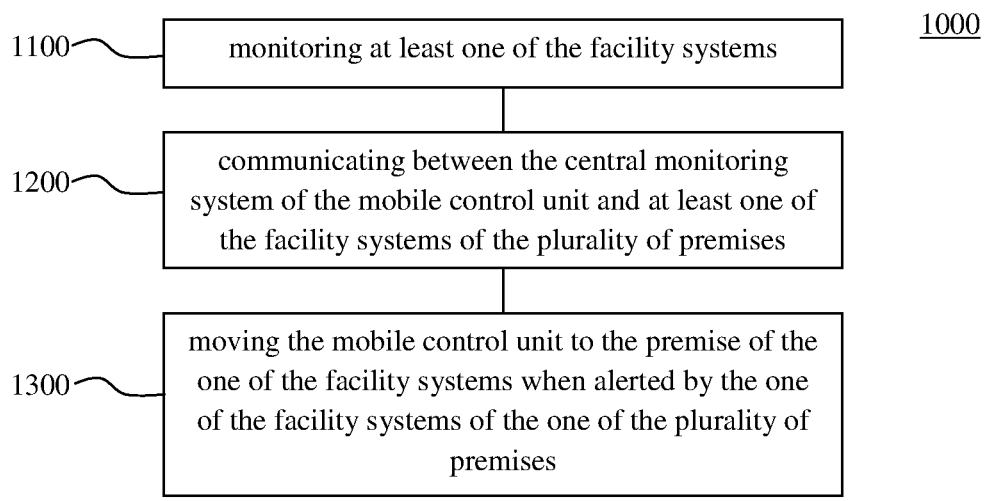
FIG. 7 shows a diagram of an exemplary embodiment of a facility management method of the facility management system in FIG. 5.

FIG. 7 shows a facility management method 1000 of monitoring a plurality of premises 900 using the mobile control unit 100, each of the plurality of premises 900 being equipped with a facility system 920. Method 1000 includes step 1100 where the facility system 920 is being monitored. In step 1200, the central monitoring system 110 of the mobile control unit 100 communicates with at least one of the facility systems 920 of at least one of the plurality of premises 900. In step 1300, mobile control unit 100 is moved to the premise of the one of the facility systems when alerted by the one of the facility systems of the one of the plurality of premises 900.

Facility systems 920 of each of the plurality of premises 900, via the security detection system 934 and/or building services detection system 954, are used to detect any incidents in or requests from the plurality of premises. Central monitoring system 110 monitors the facility systems 920 by communicating with the facility systems 920, e.g. security monitoring system may send signals to check the status in the security processing unit 932, security monitoring system 120 may receive a security alarm signal 940 sent from the security alarm system 936. Upon receiving an alarm signal, the mobile control unit 100 may be moved to the premise 900 from which the security alarm signal 940 was sent so as to investigate or attend to a request. The same steps may be taken by the building services detection system 954.

Monitoring the facility system 920 in step 1100 may include the step of monitoring the security system 930. When required, the security processing unit 932 may receive and process a security detection signal 938 sent by the security detection system 934. The security processing unit 932 may transmit a security alarm signal 940 to the central monitoring system 110. Security system 930 of the central monitoring system 110 may receive the security alarm signal 940 and alert the security officer on duty. The mobile control unit 100 may be moved, e.g. driven, to the premise from which the security alarm signal 940 was sent. Method 1000 may include patrolling around the plurality of premises 900.

Step 1100 may include monitoring the building services systems 950. When required, the building services processing unit 952 may receive and process building services detection signal 958 sent by the building services detection system 954. The building services processing unit 952 may transmit a building services alarm signal 960 to the central monitoring system 110. Building services system 950 of the central monitoring system 110 may receive the building services alarm signal 960 and alert the maintenance crew on duty. The mobile control unit 100 may be moved, e.g. driven, to the premise from which the building services alarm signal 960 was sent.

Figure 8:
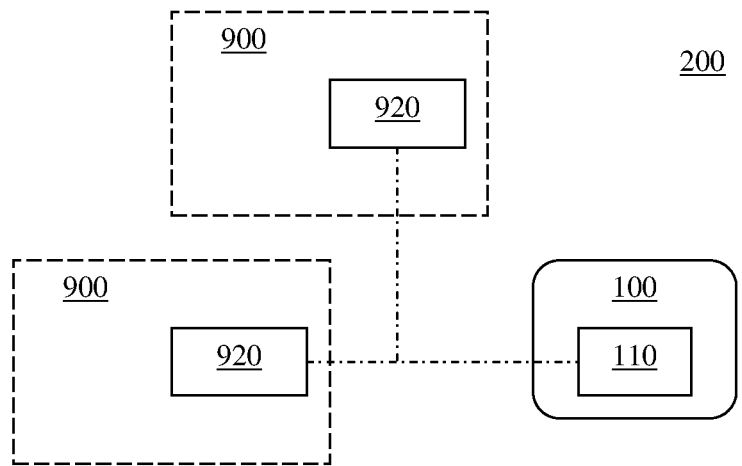
FIG. 8 shows a schematic view of an exemplary embodiment of a facility management system.

FIG. 8 shows a facility management system 200 adapted to manage at least one of the plurality of premises 900. The facility management system 200 includes the mobile control unit 100 and a facility system 920 adapted to monitor a premise 900. The facility management system 200 may include at least one facility system 920 adapted to monitor at least one of the plurality of premises 900.

The facility system 920 may include a security system 930 as mentioned earlier. Security system 930 may be adapted to send a security signal 940 to the central monitoring system 110 when required. The facility system may include building services systems 950 as mentioned earlier. Building services systems 950 may be adapted to send building services alarm signal 960 to the central monitoring system 110 when required.

Figure 9:
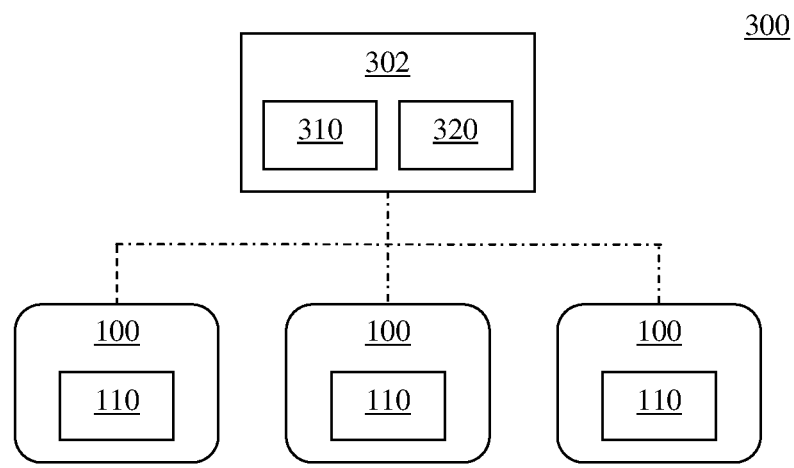
FIG. 9 shows a schematic view of an exemplary embodiment of the mobile unit control system.

As shown in FIG. 9, mobile unit control system 300 may includes a plurality of mobile control units 100, and a main control unit 302 being adapted to monitor the location of the plurality of mobile control units 100. The main control unit 100 may be adapted to be in communication with the plurality of mobile control units 100.

Mobile unit control system 300 may be managed by a main control unit 302, e.g. a head office. A main monitoring system 310, similar to the central monitoring system 110, may be set up in the main control unit 302. The main control unit 302 may include a database adapted to back up the data gathered by the central monitoring system 110. In addition, the main control unit 302 may include a GPS monitoring system 320 adapted to monitor the movement of the mobile control unit 100. The GPS monitoring system 320 may be adapted to monitor the location of security officers and/or maintenance crew. Premise 900 may include a database to back up the data from the facility system 920.

Figure 10:
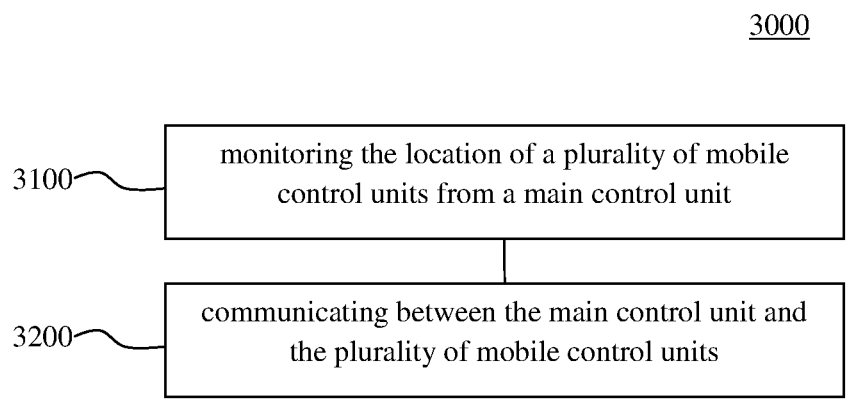
FIG. 10 shows a diagram of an exemplary embodiment of a mobile unit control method.

FIG. 10 shows a mobile unit control method 3000. Facility monitoring method 3000 includes monitoring the location of a plurality of mobile control units 100 from the main control unit 302 as shown in step 3100. Step 3200 includes communicating between the main control unit 302 and the plurality of mobile control units 100.

Figure 11:
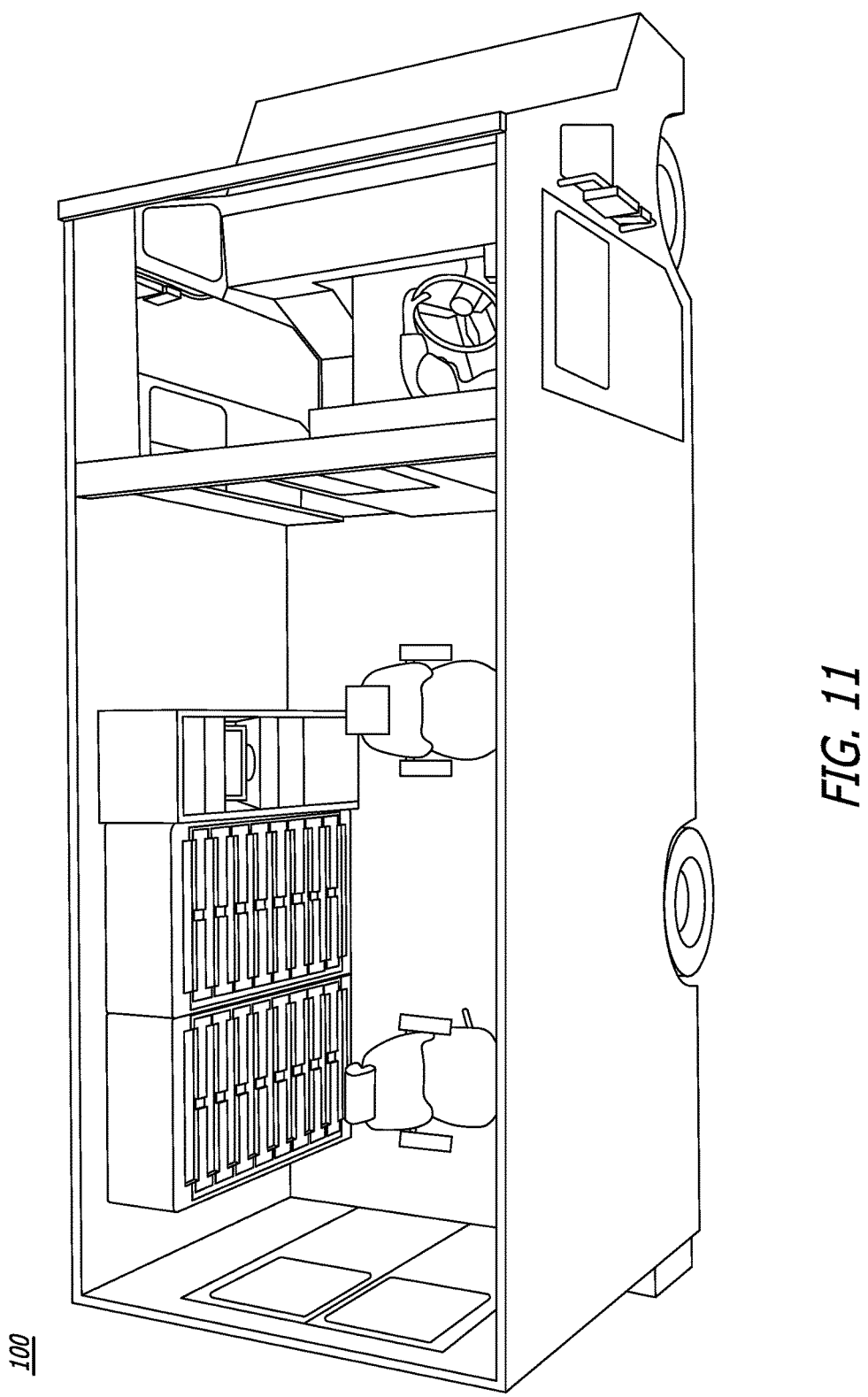
FIG. 11 shows a top front view of an exemplary embodiment of a mobile control unit.

FIG. 11 shows an exemplary embodiment of the mobile control unit 100.

Figure 12:
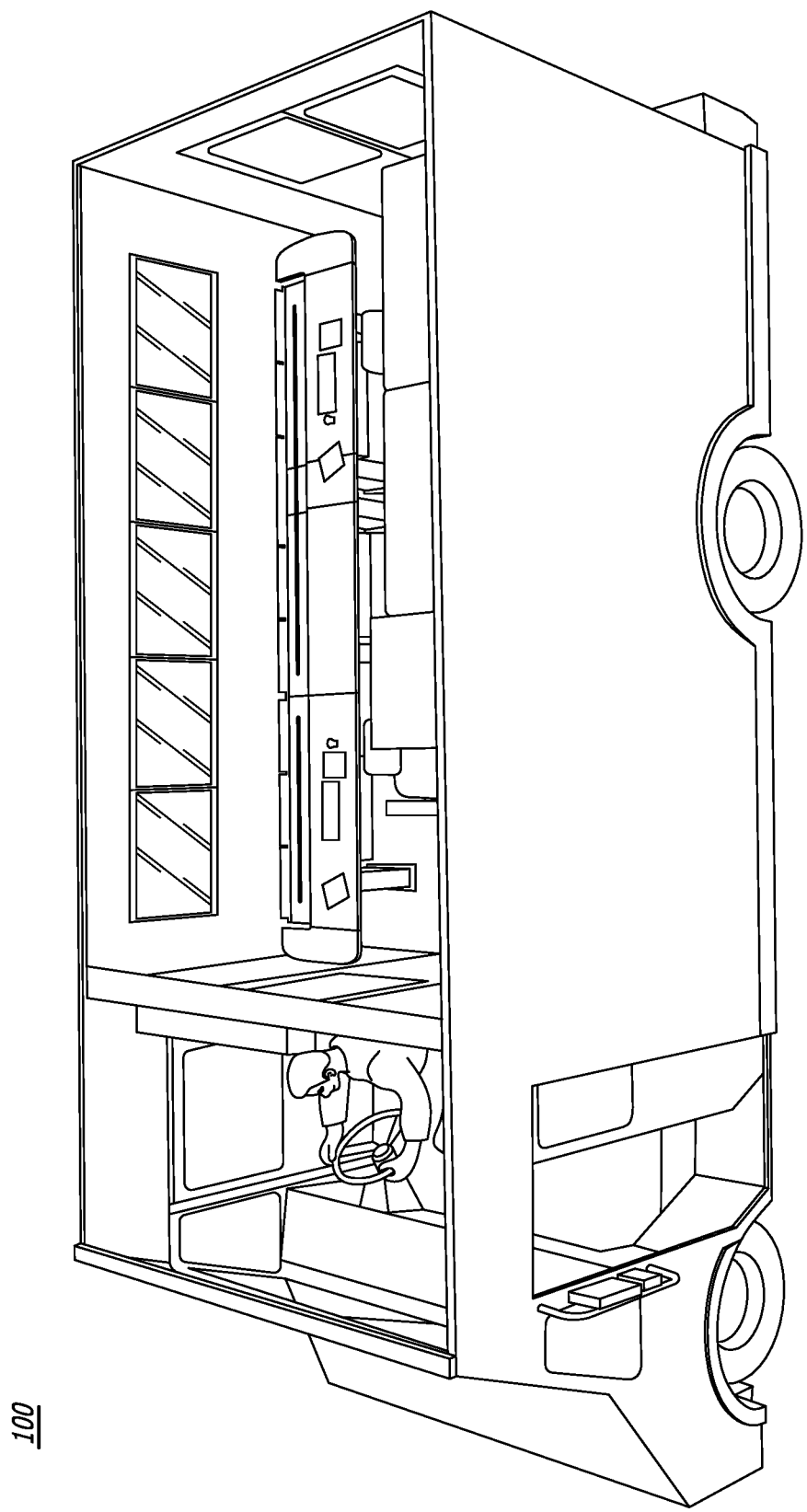
FIG. 12 shows a top hind view of an exemplary embodiment of the mobile control unit in FIG. 11.

FIG. 12 shows another view of the exemplary embodiment of the mobile control unit 100.

There may be more than one mobile control unit 100 being put into operation at one time. When there are more than one mobile control units 100, the mobile control units 100 may be in communication with each other. The mobile control units 100 may know each other's position via GPS. Therefore, the movement and location of each mobile control unit 100 may be made available to each other. Similarly, the movement and location of all mobile control units 100 may be seen by the main control unit 302. It may also be possible that the movement of any personnel in the mobile control unit 100 may be monitored by main control unit 302, e.g. via a position detection system like GPS. For example, in the event that a security officer is required to leave the mobile control unit 100 to attend to any incidents or perform a patrol, the location of the security officer may be monitored for safety purposes.

Facility management system 200 may generate regular reports on all the various aspects of the services. A vehicle hotline may also be provided within mobile control unit 100 to receive any calls for assistance.

Facility management system 200 and facility management method 1000 described above may provide an efficient and cost effective systems and methods of monitoring facilities of premises 900. The facility management system 200 and facility management method 1000 help to reduce manpower needed to monitor a plurality of premises 900 as the number of personnel required to monitor the premises may be reduced to a core number, e.g. two security officers and a maintenance crew. Especially in countries where manpower cost is relatively high, facility management system 200 and facility management method 1000 would enable substantial human resource reduction and financial savings.

In addition, facility management system 200 and facility management method 1000 provide better monitoring of security and building services in the premises 900 to achieve a more secured and efficient way of monitoring of building services. The decentralized but localized nature of the facility management system 200 and facility management method 1000 allow lower manpower resource and yet a fast response time to any alert received from the facility systems 920. Specifically, a physical presence, mobile control unit 100, at the premises 900 provide fast response, unlike remote monitoring systems used by remote monitoring companies as mentioned earlier where a response team has to be dispatched to the premises and thus takes more times than the present facility management system 200 and facility management method 1000. Even if the remote monitoring companies were to request for help from government department, e.g. police, fire department, they would require time to arrive at the premises from time of activation.

For premises that do not require the continuous presence of security officers at the premises during the day, the employment of facility management system 200 and facility management method 1000 allow prompt response by security officers when their attention are required, e.g. request for entry into a premise 900 by a visitor, while maintaining only the core number of personnel, two security officers and a maintenance crew. During the night, where human traffic and activity are lower, facility management system 200 and facility management method 1000 may provide continuous monitoring of the premises and the benefit of having a patrol team around the premises 900.

Facility management system 200 and facility management method 1000 may also provide prompt and effective backup of the central monitoring system 110 should the central monitoring system 110 is down thereby minimising downtime in monitoring the premises. In the event that a typical control centre in a premise is down, e.g. due to power failure or attacks, it would be almost impossible for the control centre to resume monitoring of the facilities quickly, e.g. within hours. If a mobile control unit 100 is down due to any reason, another mobile control unit 100 in the vicinity or a backup mobile control unit 100 may be despatched to replace the mobile control unit 100 that was down and monitoring operation can resume almost immediately, e.g. within minutes, thereby minimising the downtime in monitoring the facilities of the premises 900.

Although to set up the mobile control unit facility management system 200 may require an initial setup cost, e.g. installation of control panel, close circuit cameras, card access systems, sensors, intercom systems, barrier systems and or motion detection systems, the cost savings from the monthly manpower cost would enable a return of investment in the long run.

With the facility management system 200, once the monitoring systems are in place, it may even be possible that a premise 900 be monitored without the presence of security officers and/or maintenance crew within the premise of the building. In this way, the cost for maintaining security and/or maintenance personnel can be drastically reduced and the cost in setting up the facility management system 200 may be recovered quickly, e.g. within a few months.

The invention claimed is:

1. A decentralized and localized vehicular facility managing mobile control system for actively monitoring, remotely managing and controlling over a network a plurality of facility systems of a plurality of buildings located in different locations geographically spaced apart, the vehicular facility managing mobile control system comprising:

a plurality of mobile control units including at least one vehicle suitable to patrol a geographical area in proximity to the plurality of buildings, each of the mobile control units remotely monitor and control simultaneously over the network the plurality of facility systems of the buildings, the buildings being in different geographically spaced apart locations, the mobile control units controlling operation of the facility systems including building services systems and security systems within the plurality of buildings, the mobile control units being moveable within the geographical area to each of the different locations of the plurality of buildings to provide localized remote monitoring and control of the facility systems, each of the plurality of mobile control units comprising:

a portable decentralized monitoring system including a processor and memory with instructions to actively and directly monitor and control over the network the facility systems of the plurality of the buildings simultaneously from each of the plurality of mobile control units, the decentralized monitoring system comprising a security monitoring system to actively monitor over the network the security systems and a building services monitoring system to actively monitor over the network the building services systems of the plurality of buildings, the decentralized monitoring system being programmed to:

transmit and receive operation signals over the network directly with the security systems and building services systems and to directly control an operation of at least one of the security systems and building services systems of the plurality of facility systems of the plurality of buildings, send a control signal over the network directly to at least one of a building services processing unit of the building services system and a security processing unit of the security system to directly control the operation of the at least one of the building services system and the security system of each of the plurality of buildings from the mobile control unit, wherein each of the facility systems of the plurality of buildings comprises at least one of a security detection system and a building services detection system adapted to detect facilities in each of the plurality of buildings, receive over the network, directly in the building services monitoring system of the decentralized monitoring system of the mobile control unit, an alarm signal from at least one of the building services processing units of each of the plurality of buildings when required, the alarm signal indicating a potential fault in the building services detection system, and receive over the network, directly in the security monitoring system of the decentralized monitoring system of the mobile control unit, an alarm signal from at least one of the security processing units of each of the plurality of buildings when required, the alarm signal indicating a potential breach in the security detection system, wherein at least one of the plurality of mobile control units is adapted to move to the location of at least one of the plurality of buildings when the alarm signal is received over the network directly by the at least one of the plurality of mobile control units from the at least one of the building services detection system and security detection system of each of the plurality of buildings, wherein each of the plurality of mobile control units is configured to communicate over the network directly with at least another of the plurality of mobile control units adapted to communicate over the network directly with the plurality of facility systems of the plurality of buildings, wherein the each of the plurality of mobile control units and the at least another of the plurality of mobile control units are configured to monitor the location of each of the mobile control units, the mobile control units transmit and receive over the network electronic data tracking the movement and location information from each of the plurality of mobile control units, respectively.

2. The vehicular facility managing mobile control system of claim 1, wherein each of the plurality of mobile control units comprises a Global Positioning System device adapted to determine the location of the vehicular facility managing mobile control system.

3. The vehicular facility managing mobile control system of claim 1, wherein communication over the network between the decentralized monitoring system and the facility system is via at least one of a wide area network and a wireless local area network.

4. The facility managing mobile control system of claim 1, wherein the plurality of mobile control units of the vehicular facility managing mobile control system is adapted to patrol at least two of the plurality of buildings.

5. The decentralized vehicular facility managing mobile control system of claim 1, wherein the vehicular facility managing mobile control system comprises a main control unit, wherein the main control unit is adapted to control the plurality of mobile control units, wherein the main control unit is adapted to monitor the location of the plurality of mobile control units.

6. The decentralized vehicular facility managing mobile control system of claim 1, wherein the vehicular facility managing mobile control system is configured to receive another vehicular facility managing mobile control system's position via a Global Positioning System (GPS) device.

7. The decentralized vehicular facility managing mobile control system of claim 1, wherein the decentralized monitoring system includes a handheld smart phone.

8. The decentralized vehicular facility managing mobile control system of claim 1, wherein the decentralized monitoring system includes a handheld tablet.

9. A facility management system adapted to actively monitor and manage at least two of a plurality of buildings located in different locations geographically spaced apart, the facility management system comprising:

a plurality of facility systems of the plurality of buildings, wherein each facility system comprises at least one of a building services system and a security system; and a decentralized and localized vehicular facility managing mobile control system for remotely actively monitoring, managing and controlling over the network the plurality of facility systems, the facility managing mobile control system comprising:

a plurality of mobile control units including at least one vehicle suitable to patrol a geographical area in proximity to the plurality of buildings, each of the mobile control units remotely monitor and control simultaneously over the network the plurality of facility systems of the buildings, the buildings being in different geographically spaced apart locations, the plurality of mobile control units controlling operation of the facility systems including building services systems and security systems within the plurality of buildings, the mobile control units being movable within the geographical area to the different locations of the plurality of buildings to provide localized remote monitoring and control of the facility systems, each of the plurality of mobile control units comprising:

a portable decentralized monitoring system including a processor and memory with instructions to actively and directly monitor and control over the network the facility systems of the plurality of the buildings simultaneously from the each of the plurality of mobile control units, the decentralized monitoring system comprising a security monitoring system adapted to actively monitor over the network the security systems and a building services monitoring system adapted to monitor the building services systems of the plurality of buildings, the decentralized monitoring system being programmed to:

transmit and receive operation signals over the network directly with the security systems and building services systems and to directly control an operation of at least one of the security monitoring systems and building services systems of the plurality of facility systems of the plurality of buildings, send a control signal over the network directly to at least one of a building services processing unit of the building services system and a security processing unit of the security system to directly control the operation of the at least one of the building services system and the security system of each of the plurality of buildings from the mobile control unit, wherein each of the facility systems of the plurality of buildings comprises at least one of a security detection system and a building services detection system adapted to detect facilities in each of the plurality of buildings, receive over the network, directly in the building services monitoring system of the decentralized monitoring system of the mobile control unit, an alarm signal from at least one of the building services processing units of each of the plurality of buildings when required, the alarm signal indicating a potential fault in the building services detection system, and receive over the network, directly in the security monitoring system of the decentralized monitoring system of the mobile control unit, an alarm signal from at least one of the security processing units of each of the plurality of buildings when required, the alarm signal indicating a potential breach in the security detection system, wherein at least one of the plurality of mobile control units is adapted to move to the location of at least one of the plurality of buildings when the alarm signal is received over the network directly by the at least one of the plurality of mobile control units from the at least one of the building services detection system and the security detection system of each of the plurality of buildings, wherein each of the plurality of mobile control units is configured to communicate over the network directly with at least another of the plurality of mobile control units adapted to communicate over the network directly with the facility systems of the plurality of buildings, wherein the each of the plurality of mobile control units and the at least another of the plurality of mobile control units are configured to monitor the location of each of the mobile control units, the mobile control units transmit and receive over the network electronic data tracking the movement and location information from each of the plurality of mobile control units, respectively;

wherein the vehicular facility managing mobile control system is adapted to monitor over the network the plurality of facility systems simultaneously.

10. The facility management system of claim 9, further comprising a remote control system adapted to control the facility system in response to the alarm signal.

11. The facility management system of claim 9, wherein the decentralized monitoring system includes a handheld smart phone.

12. The facility management system of claim 9, wherein the decentralized monitoring system includes a handheld tablet.

13. A decentralized and localized vehicular facility management method for actively monitoring, remotely managing and controlling over a network a plurality of facility systems of a plurality of buildings located in different locations geographically spaced part, the method comprising:

using a vehicular facility managing mobile control system comprising a plurality of mobile control units adapted including at least one vehicle suitable to patrol a geographical area in proximity to the plurality of buildings, using each of the mobile control units to remotely monitor and control simultaneously over the network the plurality of facility systems of the buildings, the buildings being in different geographically spaced apart locations, the plurality of mobile control units controlling operation of the facility systems including building services systems and security systems within the plurality of buildings, moving the mobile control units within the geographical area to each of the different locations of the plurality of buildings to provide localized remote monitoring and control of the facility systems, each of the plurality of mobile control units comprising a portable decentralized monitoring system including a processor and memory with instructions to actively and directly monitor and control over the network the facility systems of the plurality of buildings simultaneously from the each of the plurality of mobile control units, the decentralized monitoring system comprising a security monitoring system to actively monitor over the network the security systems and a building services monitoring system to monitor the building services systems of the plurality of buildings, each of the plurality of facility systems comprising at least one of the building services system and the security system, wherein the building services system and the security system comprise a building services processing unit and a security processing unit respectively, and a security detection system and a building services detection system respectively adapted to detect facilities in each of the plurality of buildings;

monitoring directly over the network, with the decentralized monitoring system, the plurality of buildings simultaneously from the each of the plurality of mobile control units, the decentralized monitoring system;

transmitting and receiving operation signals over the network directly with the security systems and building services systems and controlling an operation of at least one of the security systems and building services systems of the plurality of facility systems of the plurality of buildings;

sending, by the decentralized monitoring system, a control signal over the network directly to at least one of the building services processing unit of and the security processing unit to directly control the operation of the at least one building services system and the security system of each of the plurality of buildings from the mobile control unit, wherein each of the facility systems of the plurality of buildings comprises at least one of a security detection system and a building services detection system adapted to detect facilities in each of the plurality of buildings;

receiving over the network, directly in the building services monitoring system of the decentralized monitoring system of the mobile control unit, an alarm signal from at least one of the building services processing units of each of the plurality of buildings when required, the alarm signal indicating a potential fault in the building services detection system;

receiving over the network, directly in the security monitoring system of the decentralized monitoring system of the mobile control unit, an alarm signal from at least one of the security processing units of each of the plurality of buildings when required, the alarm signal indicating a breach in the security detection system;

moving at least one of the plurality of mobile control units to the location of at least one of the plurality of buildings when the alarm signal is received over the network directly by the at least one of the plurality of mobile control units from the at least one of the building services detection system and the security detection system of each of the plurality of buildings; and communicating over the network directly between each of the plurality of mobile control units with at least another of the plurality of mobile control units adapted to communicate over the network directly with the facility systems of the plurality of buildings, wherein the each of the plurality of mobile control units and the at least another of the plurality of mobile control units are configured to monitor the location of each of the mobile control units, the mobile control units transmit and receive over the network electronic data tracking the movement and location information from each of the plurality of mobile control units, respectively.

14. The decentralized facility management method of claim 13, wherein the method further comprising patrolling around at least two of the plurality of buildings.

15. The decentralized facility management method of claim 13, further comprising remote controlling the facility system in response to the alarm signal.

16. The decentralized facility management method of claim 13, further comprising communicating between a main control unit and the plurality of mobile control units, controlling the plurality of mobile control units, and monitoring the location of the plurality of mobile control units.

17. The decentralized facility management method of claim 11, wherein each of the plurality of mobile control units comprises a Global Positioning System (GPS) device, and wherein the method further comprises determining the location of the plurality of mobile control units, wherein the each of the plurality of mobile control units is configured to receive the at least another mobile control unit's position via the GPS device.

18. The decentralized facility management method of claim 13, wherein the decentralized monitoring system includes a handheld smart phone.

19. The decentralized facility management method of claim 13, wherein the decentralized monitoring system includes a handheld tablet.

\* \* \* \* \*